(No Model.)
P. DOERSOM.
FIFTH WHEEL FOR VEHICLES.
No. 378,240. Patented Feb. 21, 1888.
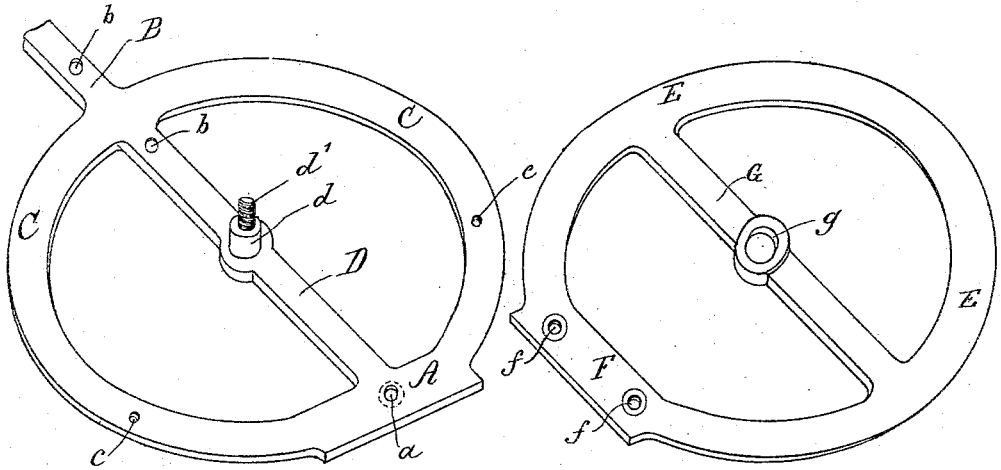
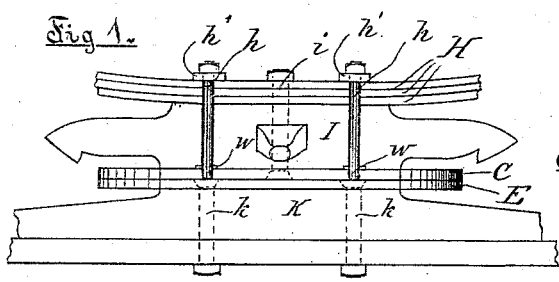
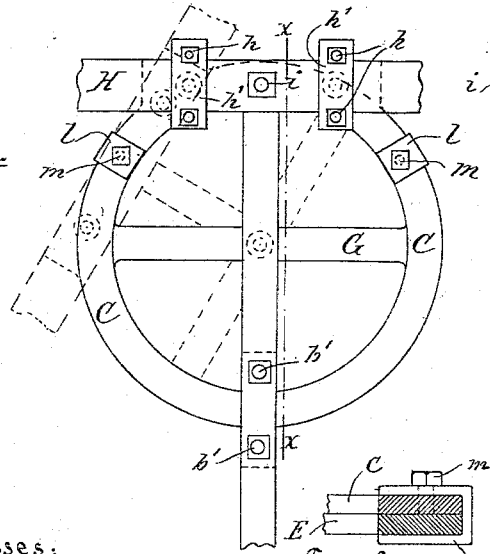
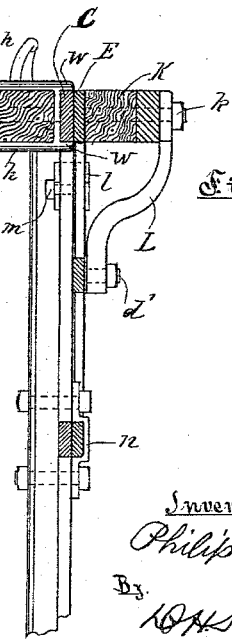
Witnesses:
Hans A. Hielm
W. H. Goll
Inventor-
Philip Doersom
By
D. H. Kulp & Co
Attorneys

UNITED STATES PATENT OFFICE.

PHILIP DOERSOM, OF LANCASTER, PENNSYLVANIA.

FIFTH-WHEEL FOR VEHICLES.

SPECIFICATION forming part of Letters Patent No. 378,240, dated February 21, 1888.

Application filed July 30, 1887. Serial No. 245,660. (No model.)

*To all whom it may concern:*

Be it known that I, PHILIP DOERSOM, of Lancaster, in the county of Lancaster and State of Pennsylvania, have invented certain new and useful Improvements in Fifth-Wheels for Vehicles; and I do hereby declare the following to be a full, clear, and exact description of the invention, such as will enable others skilled in the art to which it appertains to make and use the same.

My invention relates to fifth-wheel attachments for vehicles which have the centers of said fifth-wheels in the rear of their attachment to the axle and head-block.

It consists in the peculiar construction and combination of parts hereinafter set forth and claimed.

Heretofore a pair of fifth-wheels were constructed with two half or two quarter circles having their center in the center of the head-block. In my invention the fifth-wheels are made of two full circles having their center in the rear of the head-block, the upper circle being fastened to the head-block and the lower circle fastened to the axle. In their circumference the two circles are guided and safely secured by two hooks, so that if the plate bolted to the axle should become loose the rings or circles will be kept in their proper position.

A vehicle-body, by the use of my improved fifth-wheels and attachments, can be hung as low as any vehicle made and now in use, and yet will make a turn almost as short as that which can be made by the platform wagon or vehicle, in which case the wheels run under the body, there being no perch or coupling. The springs and head-block in my construction are fastened to the upper ring either with bolts or clips, as shown in accompanying drawings. The lower ring or circle can be fastened to the axle in the same manner. In the lower circle the cross-bar forms a boss for the upper ring or circle to turn on.

In the accompanying drawings, Figures 1 and 2 represent the pair of fifth-wheels—Fig. 1 the upper circle turned around and Fig. 2 the lower circle. Fig. 3 is a front view of the attachment; Fig. 4, a top view of the same; Fig. 5, a section through the line *x x*; Fig. 6, a side view of the hooks, showing the two circles in section.

In Fig. 1, A represents that part of the circle which is fastened to a head-block; B, the opposite end, fastened to the perch.

C is the ring on which the lower circle is sliding; D, the cross-bar, which forms the perch-plate to which the solid king-bolt $d$ is attached, whose upper end, $d'$, is of similar size with screw-head.

$a$ is a countersunk hole for the fastening of the circle to the head-block.

$b\ b$ are the holes by which the circles are secured to the perch; $c\ c$, holes for fastening the guide-hooks.

In Fig. 2, E represents the circle on which the upper circle slides. F is the part fastened to the axle by bolts through the countersunk holes $f\ f$. The cross-bar G is provided with a small boss, $g$, which prevents the rings from pressing tight together.

In Fig. 3, H represents the springs; I, the head-block, both fastened together with the upper circle, C, by the bolt $i$ and secured by the clips $h\ h$, which are bolted to the springs by using two cross-plates, $h'\ h'$. The lower part of these clips is provided with lugs W W, which prevent the upper ring or circle from turning. K is the axle, to which the lower circle is secured by bolts $k\ k$.

$l$ in Figs. 4, 5, and 6 represents the guides for the circles, being bolted fast to the upper circle by set-screws $m\ m$, and leaving the lower slide in its right place. The lower circle is also secured to the upper circle and perch by a plate, $n$, and by two bolts, $b'\ b'$. In the center of the fifth-wheels the goose-neck L is attached by the king-bolt, and secured at the other end to the axle K by countersunk bolt $d'$. When a vehicle with these attachments makes a turn, the king-bolt will be the center for turning. While the axle with wheels will turn in one direction, the body of the vehicle will move in an opposite direction, causing the vehicle to turn in a comparatively small space. Experiment has shown that when the axle turns four inches the body will turn one inch in the opposite direction.

Having thus described my invention, what I claim, and desire to secure by Letters Patent, is—

The lower circle, E, provided with holes $f$, arranged as shown and described, and at its center with hollow hub $g$, in combination with upper circle, C, having a hole, $a$, corresponding to the location of holes $f$, a king-bolt in the center of said circle C, an axle and bolster, bolts for attaching the circle E thereto through holes $f$, and a head-block and bolt, which secures the circle C, passing through hole $a$, all substantially as and for the purpose set forth.

In testimony whereof I have hereunto subscribed my name in the presence of two subscribing witnesses.

PHILIP DOERSOM.

Witnesses:
J. S. BITNER,
JOHN W. APPEL.